3,065,130
Patented Nov. 20, 1962

3,065,130
MICROBICIDAL MOLECULAR COMPLEXES OF CHLORINE AND N-ALKYL OR N-ALKYLENE CYCLIC CARBAMATES
Wilhelm E. Walles, Midland, Mich., assignor to The Dow Chemical Company, Midland, Mich., a corporation of Delaware
No Drawing. Filed Aug. 26, 1960, Ser. No. 52,015
8 Claims. (Cl. 167—33)

The present invention is directed to novel complexes characterized in part by the fact that in each smallest unit of such complex there are combined on the one hand at least one atom of chlorine and, on the other hand, at least one molecule of an N-alkylene cyclic carbamate compound. The complexes are useful as microbicides.

A full, clear, concise and exact description of the present invention is greatly facilitated by the use uniformly throughout the instant specification and claims of certain words newly coined by adaptations of known roots, as follows:

The noun "complectant" is used generically to designate a molecular chemical substance which may be caused to unite with at least one atom of chlorine in preparation of the present complexes. The complectant is the material whose properties have been observed to have the greater effect (of the effects of at least two kinds of members of the resulting complex) upon the solubility, physical state, and many other physical properties of the said complex. The present complectants are N-substituted cyclic carbamate compounds.

The regular conjugated verb "complect" (past tense "complected") is used in the transitive or intransitive sense to designate the action which may be a human action, of causing to unite in the sense of bringing about at least all of the necessary conditions to cause to unite, or the related chemical phenomenon of uniting, of the complectant and chlorine to form, in a general sense, the complex, or, in the instantaneous and unitary sense, a smallest molecular unit of such complex. The verb is analogous, in the chemical sense, to the verb "react"; however, the action it sets forth is not a metathesis, produces no byproduct, does not involve valence change of any atom, and involves mechanisms and forces other than those involved in usual chemical reactions, as also will more fully appear hereinafter.

The noun "complection" is used to designate the state or fact on the part of a chemical substance of participating in the process of uniting of the complectant and chlorine or to designate the said process; it is derived from the verb "complect" and is analogous to the noun "reaction" as derived from the verb "react."

When the theoretical maximum possible amount or ratio of the chlorine is combined with complectant according to the stoichiometric complecting processes of the present invention, the resulting condition of either the complectant or of the resulting complex is identified by the adjective "satisfied."

When a complectant or complex of the present invention exists in a condition less than satisfied, a ratio may be said to exist between its condition in fact, and its theoretical condition of satisfaction. This ratio may be expressed as either a common or decimal fraction, with respect to which the condition of satisfaction has the value of unity; and, correspondingly, the complectant alone has a value of zero or may be expressed as a percentage, with respect to which the condition of satisfaction has the value of 100 percent.

In view of these definitions, the present invention relates to novel complexes of chlorine and N-substituted cyclic carbamate compounds, and is directed specifically to a complex of chlorine and a member of the group consisting of the N-alkyl cyclic carbamates, N-haloalkyl cyclic carbamates, N-dihaloalkyl cyclic carbamates, and polymers of N-alkenyl cyclic carbamates wherein the N-alkenyl radical contains from 2 to 4, inclusive, carbon atoms, the N-alkyl radical contains from 2 to 4, inclusive, carbon atoms, the N-haloalkyl radical contains from 2 to 4, inclusive, carbon atoms and not more than 2 halogen atoms, the unitary cyclic carbamates being characterized by the formula

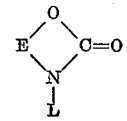

wherein E represents a divalent radical which is a member of the group consisting of hydrocarbons and halohydrocarbons containing from 2 to 18 carbon atoms, inclusive, whereof the valences are separated by from 2 to 4, inclusive, carbon atoms, and also inclusive of orthophenylene, and substituted orthophenylene; and L is a member of the group consisting of alkyl, haloalkyl, dihaloalkyl and alkenyl, said alkyl and alkenyl radicals containing from 2 to 3 carbon atoms, inclusive. The foregoing values for E and L are employed throughout the present specification and claims.

The naming of the present complectants may be based upon their structure as cyclic carbamates, in which instance the self-same compound may be known as polymerized N-vinyl-2-oxazolidinone, or as polymerized N-vinyl cyclic ethyl carbamate. Such variations in nomenclature are without weight as regards the actual identity or behavior of the compounds.

When the valences of the radical E are separated by two carbon atoms, that is to say, when they are valences of adjoining carbon atoms, the cyclic carbamate moiety comprises a 2-oxazolidinone or substituted 2-oxazolidinone or, as such compound is commonly known, an oxazolidinone. When the said valences are separated by three carbon atoms, that is to say when they are valences of each of two carbon atoms with another carbon atom between, the said compounds comprise 3-alkenyl-tetrahydro-2H-1,3-oxazin-2-one and its derivatives and are commonly known as oxazinidinones. Similarly, when the valences of the radical E are separated by four carbon atoms, that is to say when they are valences of each of two carbon atoms with two other carbon atoms between, the present cyclic carbamates may be named as 3-alkenyl-tetrahydro-1,3-oxazepin-2-(3H)-one and its derivatives, and are commonly known as oxazepinanones. When the said valences are separated by two carbon atoms which are adjacent members of a benzene ring, the compounds are commonly known as benzoxazolidinones.

The divalent radical represented by E is illustrated by alkylene groups such as dimethylene, normal trimethylene, normal tetramethylene, isopropylene, 2,3-butylene, 2,3-amylene, 2,4-amylene, 1,4-amylene, 1,2-hexylene, 1,3-amylene, 2,4-hexylene, 2,3-hexylene, 2,5-hexylene, 3,4-hexylene; by cycloalkyl-substituted alkylene groups such as cyclohexyl ethylene, cyclohexyl propylene, 1-cyclohexyl-1,2-butylene, 1-cyclohexyl-1,3-butylene, 1-cyclohexyl-2,3-butylene, 2-cyclohexyl-1,2-butylene, 2-cyclohexyl-1,3-butylene, 2-cyclohexyl-1,4-butylene, and similar cyclopropyl, cyclobutyl, cyclopentyl, cycloheptyl and cyclooctyl alkylene derivatives; by such phenylalkylene and substituted phenylalkylene groups as phenylethylene, 1-phenyl-1,3-propylene, 1-phenyl-1,2-propylene, 1,3-diphenyl-1,2-propylene, 2-phenyl-1,3-propylene, (1-p-chlorophenyl)-1,3-propylene, 3(m-chlorophenyl)-1,4-hexylene, 2(o-chlorophenyl)-1,4-amylene, 11(2,4-dichlorophenyl)-2,4-dodecylene, 2(2,4,5 - trichlorophenyl) - 3,4-hexylene, and similar compounds wherein the substituent halogen is fluoride, bromine, or iodine, (p-tolyl)-dimethylene, 2(o-tolyl)-trimethylene, 1-(m-tolyl) - tetramethylene, p - hydroxyphenyl dimethylene, 5(o - hydroxyphenyl)-5,7-decylene; α - naphthylethylene; 1-(β-naphthyl)-trimethylene: also illustrative of phenylene and substituted o-phenylene radicals as representing the entire group E are such radicals as o-phenylene itself, 3-chloro-o-phenylene, 4-chloro-o-phenylene, and the various derivatives of such halophenylene radicals wherein the halogen ring substituent is fluorine, bromine, or iodine. Also, E is illustrated by cycloalkylene groups and by cycloalkyl alkylene groups.

The alkenyl groups represented by L in the present complectants are illustrated by vinyl, allyl, and isopropenyl; the alkyl groups represented by L are illustrated by ethyl, n-propyl and isopropyl; and the halo- and dihaloalkyl groups represented by L are illustrated by chloroethyl, bromoethyl, iodoethyl, iodobromoethyl, dichloropropyl, and similar dihalo-substituted ethyl, propyl and isopropyl groups.

The new complexes are solids or liquids at room temperature which decompose with release of elemental chlorine when in contact with cool or cold water. Also they decompose spontaneously at elevated temperatures by chemical reaction between complectant and chlorine. Each of the new complexes exhibits a characteristic absorption spectrum in at least the infra-red range, in that each absorbs the components of incident broad spectrum radiation more readily at some frequencies than at others, and in a pattern representative of the complex.

The new chlorine complexes are, in general stable in an atmosphere of chlorine or part chlorine over a substantial range of conditions, and somewhat stable in air. Titration of the complexes with sodium thiosulfate solution in procedures known for the determination of free chlorine determines the entire quantity of complexed chlorine therein.

The new complexes are useful as parasiticides for the control of a wide variety of bacterial and fungal organisms, and are adapted to be employed as germicides, and as bleaches.

The complexes of the present invention are prepared by contacting chlorine in anhydrous, liquid form with a complectant which is a cyclic carbamate compound, at least a substantial proportion of whose units correspond to the formula

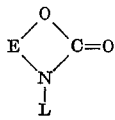

The complecting is preferably but not necessarily carried out in liquid medium, which may be excess chlorine. The complexes are formed smoothly when chlorine is contacted with complectant at any temperature at which the chlorine is liquid under less than about ten atmospheres pressure.

The complexes are not reliably stable at the temperatures at which higher pressures are needed to liquefy chlorine. Following the complecting, the excess chlorine employed as liquid medium may be separated by evaporation, to remove uncombined halogen and obtain the desired complex product as a relatively pure residue, usually solid at room temperatures. The chlorine may be removed by procedures in which a stabilizing atmosphere is maintained about the resulting complex, if desired. Such stabilizing atmosphere may be chlorine, or a mixture of chlorine and an inert gas, or chlorine and air. Under these conditions the halogen content of the resulting complex is maintained higher, and the structure of the complex is better preserved than when the complex is maintained in an atmosphere containing no chlorine.

In an alternative procedure, the complectant in dry form is exposed to an atmosphere comprising chlorine as gas. The atmosphere may be pure chlorine or chlorine diluted with an inert gas which may be a noble gas, air, nitrogen, or the like. The desired exposure may be accomplished with the complectant in a granular or particulate mass more or less compactly contained in a vessel; or the complectant may be cast, extruded, chopped or spun in known ways to obtain fibers, filaments, or shreds which tend to be self-supporting. Such forms usually allow larger interstices within which the diffusion of the gas more readily takes place. Also, the powdered complectant, or a complectant film deposited by the evaporation to dryness of a solution or dispersion thereof, may be distributed over a supporting structure of inert material, such as a loose mass of glass fibers or the like; such procedures afford advantageously large surface area for contact of chlorine and complectant, especially when employing gaseous chlorine.

The resulting complex may be employed disposed over the surface of a supporting inert material upon which it was prepared; or may be removed in known procedures, as desired, for employment without such matter foreign to the complex.

The degree of molecular aggregation and, correspondingly the resulting macromolecular weight of polymeric complectants when such are employed herein, is believed to be significant chiefly with respect to certain physical properties, but virtually without effect upon the ease of formation, or chemical or biological properties of the present complexes. Such complectants may vary within extreme limits, and many of them may be characterized by their K-values as described by Fikentscher in Cellulosechemie, 13, 60 (1932). In particular, the K-values can be determined for those which are relatively free from cross-linking and which are soluble. In such case, determination of K-values is relatively reliable up to a K-value of about 200. Good results are obtained with the use, in the present invention, of complectants having K-values as high as at least 200. When the polymeric complectant is characterized by being significantly cross-linked, as may be the case, in particular, with copolymeric substances of which one or more members is characterized by having a plurality of ethylenically unsaturated copolymerizable moieties, the concept of the K-value according to Fikentscher soon ceases to have valid meaning, depending, as it does, upon solubility, a property which is rapidly diminished by cross-linking. Good results in the practice of the present invention have been obtained when employing as complectants, cross-linked copolymeric substances having molecular weights in excess of twenty million. It is pointed out that in such situation, the mechanical entanglement of one polymer molecule with another becomes sufficiently great that it becomes meaningless to regard molecular weight as it is regarded in respect to compounds of simpler structure. However, good results are obtained when employing lightly cross-linked, mildly cross-linked and highly cross-linked polymeric complectants. In particular, excellent results have been obtained when employing polymeric complectants so highly cross-linked that in the presence of such solvent as water, these substances exhibit 100 percent or more swelling. Illustrative of the cross-linking monomeric substances to be employed in the preparation of such cross-linked copolymers are divinylbenzene and acetyl triallylcitrate. The hydrogenated or N-haloalkyl monomer is successfully employed as complectant, as are also the low polymers.

Although the formation of the present complexes is believed to depend upon the presence of the

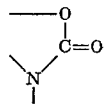

group in the cyclic carbamate moieties of which the above group is characteristic, polymerized complectants may contain as a portion of their monomeric members moieties which do not possess this group. Thus, for example, complexes of the present invention may readily be prepared employing, as complectants, starting polymeric materials which are copolymers of the N-alkenyl cyclic carbamates hereinbefore set forth polymerized together with any other ethylenically unsaturated copolymerizable monomeric substance. Illustrative of the ethylenically unsaturated copolymerizable monomeric substances which may be employed in the preparation of complectants according to the present invention are 1,3-butadiene, 2,3-dimethyl-1,3-butadiene, isoprene, piperylene, 3-furyl-1,3-butadiene, 3-methoxy-1,3-butadiene, chloro-1,3-butadiene, 2-bromo-1,3-butadiene, 2-chloro-3-methyl-1,3-butadiene, styrene, p-chlorostyrene, p-methoxystyrene, α-methylstyrene, vinylnaphthalene, acrylic acid, methacrylic acid, methyl acrylate, ethyl acrylate, methyl α-chloro-acrylate, methyl methacrylate, ethyl methacrylate, butyl methacrylate, methyl ethacrylate, acrylonitrile, methacrylonitrile, methacrylamide, methyl isopropenyl ketone, methyl vinyl ketone, methyl vinyl ether, vinylethinyl alkyl carbinols, vinyl acetate, vinyl chloride, vinylidine chloride, vinylfurane, vinylcarbazole, N-vinyl pyrrolidone, N-vinyl-3-morpholinone, vinyl formate, maleic acid, itaconic acid, fumaric acid, crotonic acid, allyl alcohol, vinyl fluoride, 2-chloro-allyl alcohol, 1-allyloxy-3-chloro-2-propanol, N-vinylsuccinimide, N-tertiary butyl acrylamide, N-tertiary octyl acrylamide, 1,2,-dichloropropene-2, 1,2-dichloropropene-1, trichlorostyrene, tetrachloro styrene, pentachloro styrene, o-methyl styrene, m-methyl styrene, p-methyl styrene, p-tertiary butyl styrene, p-isopropyl styrene, p-acetoxy styrene, p-phenyl styrene, p-benzoyl styrene, p-cyano styrene, m-nitro styrene, m-trifluoromethyl styrene, m-fluoro styrene, m-tertiarybutyl styrene, stearoyl styrene, oleoyl styrene, linoleoyl styrene, α-vinyl-napthalene, β-vinyl-naphthalene, 1-(α-naphthyl)-propene-1, 2-(α-naphthyl)-propene-1, 2-(α-naphthyl)-butene-2, 3-(α-naphthyl)-pentene-2, 2-bromo-4-trifluoromethyl styrene, β-bromo-α,β-diiodo styrene, β-bromo-p-methyl styrene, β-bromo-p, β-dinitro styrene, m-secondary butyl styrene, α,β-dibromo styrene, β,β-dibromostyrene, m-tertiarylbutyl styrene, α-chloro-2,4,6-trimethyl styrene, α-chloro-2,3,4,6-tetramethyl styrene, β-chloro-o-nitrostyrene, 1-chloro-2-(p-tolyl)-1-butene, 4(1-chlorovinyl)-anisole, 2-(1-chlorovinyl)-4-methylanisole, 1-chloro-4-vinyl-naphthalene, 4(1-chlorovinyl)-2-isopropyl - 5 - methylanisole, 4(2-chlorovinyl)-2-isopropyl-5-methylanisole, cinnamic acid, p-cyclohexyl styrene, 2- ethyl-1-phenyl-1-butene, 3,5-diethyl styrene, eugenol, 4-fluoro-3-trifluoromethyl-α-methyl-styrene, α,α-trifluoro-m-propenyltoluene, isoeugenol, 2-isopropyl-5-methyl-4-vinyl anisole, safrole, isosafrole, 2-methyl-3-phenyl-2-pentenemethyl styryl ether, N,N-dimethyl-m-vinylaniline, vinylbenzenesulfonamide, 2-(α-naphthyl)-2-butene, 1,1-diphenylethylene, propenyl benzene, stilbene, 1-vinylacenaphthene, m-vinylaniline, p-vinylbenzoic acid, p-vinylbenzonitrile, p-vinylbiphenyl, 2-vinylfluorene, 6-vinyl-1,2,3,4-tetrahydro-naphthalene, p-vinylphenetole, o-vinylphenol, vinylbutyrate, vinylbenzoate, vinylquinoline, 2-vinylpyridine, 2-methyl-5-vinylpyridine, 4-vinylpyridine, 2-vinyl-5-ethylpyridine, N-vinylpyrrolidone, N-vinylphthalimide, N-vinylsuccinimide, N-vinylacetamide, N-vinyldiacetimide, N,N-diallylacrylamide, diallylamine, diallylmethacrylamide, 2,5-dimethyl-3,4-dihydroxy - 1,5 - hexadiene, 2,5-dimethyl-2,4-hexadiene, divinylbenzene, divinyl ether of diethylene glycol, trivinyl benzene, 2,7-dimethyl-1,7-octadiene, 1,7-octadiene, p-diisopropenylbenzene, 1,3,5-triisopropenylbenzene, p,p'-diisopropenylidiphenyl, 1,1,3,5-tetrallyl-1,3-propanediol, 1,1,3,3 - tetramethallyl-1,3-propanediol, 4,6-dimethyl-4,6-dihydroxy-1,8-nonadiene, 2,4,6,8-tetramethyl-4,6-dihydroxy-1,8, nonadiene, nonadiene-1,8,2,8-dimethylnonadiene-1,8, acetyl trially citrate, and the like, and the derivative of such compounds as are known to those skilled in the art, including the esters of such compounds as are acids, alcohols, and phenols; the nuclear substituted derivatives thereof, the olefins such as ethylene, propylene, and the like; and other unsaturated hydrocarbons, esters, alcohols, acids, ethers, and so forth of the types described. Maleic anhydride may also be copolymerized with the present N-alkenyl-cyclic carbamate materials and with mixtures thereof with other ethylenically unsaturated copolymerizable monomeric substances in an amount which corresponds to not more than one half of the total number of monomeric moieties, to prepare a copolymeric complectant to be employed in the present invention. It is to be understood, as is well known to those skilled in the art, that preparation of the described polymers may call for any of a variety of catalysts including Ziegler catalysts, hydrogen peroxide or other peroxygen catalyst, and α,α'-azobis(isobutyronitrile), or a combination of such catalysts. Likewise, concentrations of monomers, polymerization temperatures, and (especially with respect to those copolymerizable materials which exist as gases under standard conditions) reaction pressure may be regulated in known ways according to the monomeric members employed and the polymeric members sought.

It will be recognized by chemists that certain moieties herein set forth as co-members with the N-alkenyl-cyclic carbamate substances in the various copolymeric complectants would, under some conditions, react with chlorine. However, as members of a copolymer with the said oxazolidinone, oxazinidinone, and oxazepinanone materials, and when contacted with elemental chlorine in the indicated procedures, the said moieties do not usually react with chlorine, even in excess, the present complexes being preferentially formed. In any event, if there is doubt that a copolymeric substance might under some conditions chlorinate directly with formation of hydrogen chloride, this may be avoided by carrying out the complecting of the present invention with chlorine liquefied under atmospheric pressure, whereby the ambient temperature of the process is maintained at or below approximately minus 35° C., that is to say, approximately 238° K.

When the complecting is thus carried out, and when excess chlorine is vaporized by a gentle rise in temperature from the low temperatures thus employed, the complexes are formed with no significant evolution of hydrogen chloride of reaction from any of the components of polymeric complectants including both homo- and copolymeric complectants.

In order that the complexes of the present invention may exist, it is essential that the chlorine be combined with the complectant in the proportion of at least 1 atom per complectant molecule. Preferably, when employing a polymeric complectant, chlorine should be present in approximately the statistical average proportion of at least one chlorine atom for fifty monomeric units in a complectant molecule. Although presence of a smaller proportion of chlorine will produce a complex of the present invention, such complex, containing a smaller proportion of a complected halogen, may have the disclosed useful properties in only a small degree. The preferred and more useful products are characterized by having at least one halogen atom per least unit and in the polymeric products, an average over-all ratio of from 0.02 to 1.0 halogen atom per recurring moiety in the polymer.

For the production of the complexes of the present invention when the complectant is composed exclusively of polymerized N-alkenyl cyclic carbamates, chlorine should be employed in the statistical average proportion of at least one halogen atom per fifty recurring cyclic carbamate monomeric units in the complectant molecule. Such products are characterized by having at least one chlorine atom per least unit and an average over-all ration of from 0.02 to 1.0 halogen atom per cyclic carbamate monomeric unit. A more preferred embodiment of the present invention comprises the complexes containing, as an average, at least one halogen atom per each ten monomeric units of whatever kind.

In one manner of carrying out the present complecting, the dry complectant and dry chlorine are combined and mixed together, desirably in a liquid reaction medium, which may be excess chlorine. Formation of the complex goes forward smoothly at temperatures in the range of from at least about −105° C to about +20° C. Under these conditions the complecting is completed promptly, for example, in from less than one minute to about an hour. At temperatures above about −35° C., chlorine is a liquid only at superatmospheric pressures. Such pressures may be employed. In any case, it is advantageous to provide agitation which may include vibration at frequencies from subsonic to suspersonic, stirring, recycle pumping, or, especially in the absence of liquid reaction medium may be milling, grinding, tumbling, or forced-gas agitation. It is preferred and under some conditions may be critical to avoid the presence, in the complection mixture, of influences which are known to favor halogenation reactions. Such influences include iron, metallic halides, phosphorous halides, ultra-violet, X-ray, and nuclear radiation, and the like. Upon the completion of the complection, liquid medium such as excess chlorine, may be separated by filtration or evaporation to remove excess halogen and obtain the complex product as a solid residue.

The following examples illustrate the present invention but are not to be considered as limiting it.

*Example 1.—Complex of Chlorine and Polymeric-5-Methyl-3-Vinyl Oxazolidin-2-One*

A wide mouth flask of glass having a low coefficient of expansion and being, therefore, relatively resistant to thermal shock was placed in a bath of acetone chilled with solid carbon dioxide ("Dry Ice") by means of which the bowl portion of the flask was cooled to approximately −75° C. Under these conditions, gaseous chlorine was admitted slowly to the said flask wherein it condensed to obtain 100 milliliters of a yellow liquid. As cooling was continued under the stated conditions, 30 grams of polymeric 5-methyl-3-vinyloxazolidin-2-one (of a macromolecular weight corresponding to the K-value of Fikentscher of 30), was added slowly and in small portions. Thereafter, the mixture was stirred with continued chilling for one hour, under atmospheric pressure and with provision for escape of evaporating chlorine.

During this time, the said polymeric complectant swelled and softened to form a yellow viscous translucent gel. Upon completion of the formation of the said gel complex-chlorine mixture, the cooling bath was removed and the temperature of the flask and contents permitted slowly to equilibrate with room temperature, with continuing provision for removal of gaseous chlorine. After approximately 14 hours during which the flask was loosely covered and the gas contents of the said flask, by spontaneous diffusion, became a mixture of chlorine with a predominant content of air, the resulting complex was found to be a white, powdery solid. This solid was analyzed and found to contain 10.2% chlorine, in the binding of which in the present complexes, no hydrogen chloride was evolved. The said chlorine was titratable quantitatively with thiosulfate. The complex had a distinct odor of chlorine and was found, by analysis of successive samples, to be liberating gaseous chlorine at a relatively low rate, when exposed to open atmosphere. When confined in a closed container wherein the partial pressure of chlorine slowly rises through liberation of chlorine from the said complex, a point of equilibrium is promptly reached whereat any further release of chlorine from the said complex is balanced by corollary intake of chlorine from the adjacent atmosphere, with the result that the chlorine content of the said complex becomes stabilized. When it is desired to store the said complex stably and without loss of bound chlorine over a period of time, this may readily be done by confining the said complex in a closed container (which, of course, together with its closures should be resistant to chlorine attack) the atmosphere within which contains a substantial fraction of chlorine, such as, perhaps, from 5 to 50% chlorine by weight. However, the total pressure of such atmosphere within the said container need not exceed normal atmospheric pressure.

The rate at which the said complex liberated gaseous chlorine in vacuum was determined by periodical analysis of samples taken from the said complex held for a period of time at room temperature under pressure of 10 millimeters mercury.

When the tests were begun, the said complex had been exposed, loosely covered, to ordinary atmosphere at room temperature (approximately 24° C.) for about 12 hours since being prepared and contained 10.2% chlorine by weight. This chlorine content corresponds to a little more than 1 chlorine atom for each average 4 recurring cyclic carbamate moieties in the complectant. After thirty minutes under vacuum, a sample of the said complex was analyzed and found to contain 2.1% chlorine by weight. An hour after the initial sample was analyzed a third sample was analyzed and found to contain 1.9% chlorine, while a sample taken 3½ hours after the first said sample, above, was found to contain 0.7% chlorine by weight.

There was no significant change during this time in the chlorine content of the said complex sample contained in a stoppered bottle under atmospheric pressure.

A small sample of the said complex was dropped into water at room temperature. An immediate decomposition resulted, with the rapid, even violent, evolution of bubbles which were identified as bubbles of chlorine gas. Portions of the liberated gas reacted with water in the known reaction to obtain some hydrochloric and some hypochlorous acid.

*Example 2*

The present example is carried out in procedures most of which are identical with those foregoing. The distinctive difference is found in the fact that the present example is carried out at higher temperatures and under super-atmospheric pressure. It is well-known (see the International Critical Tables (National Academy of Science, 1928), volume III, page 202) that chlorine may be liquefied at temperatures as high as approximately 75° C., by the application of super-atmospheric pressure. Liquid chlorine under pressure up to about 40° C. but preferably not above about 25° C., may be used in the instant process.

The present complex is formed at approximately 0° C. and under a pressure of chlorine of approximately 3.7 atmospheres. Under these conditions, chlorine is a mobile yellow liquid. A closed sysem is provided having means for combining the liquefied chlorine slowly, dropwise, and with stirring into the polymeric complectant substance. Under the stated conditions, the formation of the complex of chlorine and polymeric 5-methyl-3-vinyl-oxazolidin-2-one takes place more rapidly than it takes place at −75° C. as in the first example; the resulting solution of the said complex in excess liquid chlorine is, again a yellow translucent gel. In the present example, it is not necessary to elevate the temperature to remove excess chlorine. At a point provided in the closed system, a valve is opened whereby chlorine, of pressure in excess of atmospheric pressure, is exhausted and excess chlorine is promptly removed from the said complex, leaving, again, a product in all respects similar to the product described as a result of Example 1.

Although the said complexes slowly lose complexed chlorine at ordinary room temperature, under the said conditions, no hydrogen chloride is evolved, thus indicating that no metathetical chlorination takes place.

When a sample of such complex was gently warmed to temperatures somewhat above room temperature, at an undetermined temperature believed to be approximately in the range of 35°–50° C., an exothermic chemical reaction spontaneously initiated, at first slowly, and then went forward at an increasing rate of reaction to completion, with a sharp temperature rise to an undetermined upper limit temperature of the resulting reaction mixture; hydrogen chloride of reaction was evolved and identified by analysis. As a result of this spontaneous reaction, the said complex was destroyed, and various of the hydrogen atoms normally present upon the said complectant were replaced by chlorine, giving a substantially chlorinated product of which the structure was not determined.

*Example 3.—Complex of Chlorine and Polymeric 5-Ethyl-3-Vinyloxazolidin-2-One*

Polymeric 5-ethyl-3-vinyloxazolidin-2-one having a K-value according to Fikentscher of 23.5, a white thermoplastic resinous material, soluble in ethanol and insoluble in water, and softening appreciably with incipient decomposition at a temperature of about 200° C., is intimately contacted in finely divided form, with liquid chlorine to prepare a complex of the present invention. The procedure and products are essentially the same as those hereinbefore described except that the resulting product together with excess chlorine never becomes a true solution, but remains, at most, a viscous translucent yellow gel. Upon equilibration with room temperature, the resulting product loses excess chlorine and becomes a white solid which, after an extended period of standing at room temperature incompletely covered, contains approximately 5% by weight of chlorine.

*Example 4.—Complex of Chlorine and Polymeric 5-Phenyl-3-Vinyloxazolidin-2-One*

In the present example, the complectant is a polymer of 5-phenyl-3-vinyloxazolidin-2-one of which the monomer is a solid melting at 79.5–80.5 C. The resulting polymer does not exhibit a sharp melting temperature but softens gradually at temperatures in the vicinity of 100° C. and liquefies entirely at temperatures below 200° C. The polymer is soluble in aromatic organic solvents such as benzene, toluene, xylene, the halogenated aromatic organic solvents and the like.

The procedures of the present example are essentially the same as those hereinbefore set forth. Chlorine as a cold liquid is added, under atmospheric pressure, dropwise and with continuous stirring to the complectant oxazolidinone compound in finely divided form. The chlorine is at first taken up and the product is a colorless dry powder; but subsequently, the resulting mixture becomes moist with excess chlorine and eventually becomes a translucent yellow gel substance.

Excess chlorine is thereafter removed by vaporization to obtain, as a white, dry, relatively stable powdered material, a complex of chlorine and polymeric 5-phenyl-3-vinyloxazolidin-2-one. The said complex exhibits, as did the previous complexes, the property of slowing yielding chlorine to adjacent atmosphere and of decomposing with evolution of heat when warmed to a temperature at which such reaction is initiated, approximately 40° C. Also, the present complex is unstable in water (although the complectant per se is insoluble in water).

*Example 5.—Complex of Chlorine and 3-Ethyl-5-Methyloxazolidin-2-One*

In the present example, the complectant is 3-ethyl-5-methyloxazolidin-2-one, a substance fully meeting the complectant definitions hereinbefore and, at room temperature, a liquid.

Chlorine (5 grams) is liquefied in the manner hereinbefore described employing a bath of acetone and Dry Ice. Into the resulting liquefied chlorine there is added slowly, dropwise, and with stirring, 7.5 grams N-ethyl-5-methyloxazolidin-2-one. Upon completion of the addition of the oxazolidinone compound, the resulting mixture is permitted to stand, under refrigeration for a period of time to achieve equilibrium distribution of the chlorine and form a complex according to the present invention. At the end of approximately 5 hours' standing, the resulting mixture is removed from refrigeration and permitted to equilibrate slowly with room temperature, overnight, under a loose cover.

Upon subsequent examination, the complex is found to be a colorless liquid having the odor characteristic of chlorine. The complex decomposes with release of elemental chlorine upon being contacted with cool or cold water and decomposes with evolution of hydrogen chloride upon being warmed to approximately 35° C.

*Example 6.—Complex of Chlorine and a Copolymer*

In the present example, the complectant is a polymer comprising three different monomeric moieties, derived from, respectively, vinyl acetate, N-vinylpyrrolidinone, and 5-lauryl-3-vinyloxazolidin-2-one. The monomeric moieties are present in the ratio, approximately, of 5 molar proportions of the oxazolidinone, 4 molar proportions of the pyrrolidinone and 1 molar proportion of the vinyl acetate in each 10 molar proportions of monomeric moieties. The said terpolymer has a molecular weight of approximately 100,000 and is relatively dispersible in a wide range of solvents including water, lower alkanols, oils, fats, and such known organic solvents as acetone and other lower alkyl ketones, benzene, toluene, and the like. The terpolymer is a solid at ordinary room temperatures.

The procedures of the present example, are, in the preparatory phase, similar to those foregoing. The liquid chlorine is added slowly, dropwise, and with stirring to a finely ground mass of the said terpolymer at approximately −75° C. As a result, there is formed a yellow gel which is a mixture of a complex of the said complectant and chlorine together with excess chlorine.

The resulting complex is maintained at approximately −75° C. and excess chlorine removed by the evacuation of the space above the complex in the flask wherein the complex is prepared. After standing, at approximately −75° C., for approximately 4 hours under approximately 0.1 millimeter mercury pressure, the resulting complex is a white, waxy solid. When the temperature of the said complex is permitted to equilibrate with room temperature, approximately 20° C., the said complex undergoes spontaneous decomposition with evolution of hydrogen chloride of reaction and rapid increase in temperature. The said terpolymeric complex is appreciably less stable than the homopolymeric and non-polymeric complexes hereinbefore described.

*Example 7.—Complex of Chlorine and Polymeric 6-Methyl-3-Vinyl-Oxazinidin-2-One*

The present example is carried out in all respects as was Example 1, hereinbefore described except that, as complectant there is employed polymeric 6-methyl-3-vinyloxazinidin-2-one. The polymer has a K-value according to Fikentscher of 30, is a white thermoplastic resinous material softening appreciably at temperatures of about 100° C., and softening further with incipient decomposition at about 200° C. As a result of the said preparative procedures, there is obtained a white, finely-powdered complex of polymeric 6-methyl-3-vinyloxazinidin-2-one and chlorine containing approximately 12 percent by weight of chlorine. The said complex decomposes with evolution of hydrogen chloride when heated at temperatures in excess of approximately 50° C. and decomposes spontaneously with release of chlorine when placed in water.

*Example 8.—Preparation of a Complex Employing Gaseous Chlorine*

Polymeric 5-phenyl-3-vinyloxazolidin-2-one (25 grams) is placed in a desiccator with phosphorus pentoxide and maintained therein at room temperature for a month to remove from the said substance all possible water. The resulting substance, in finely divided form, is dusted over the surfaces of a dried packing of glass wool in a closed glass laboratory system provided with means for the introduction, through a desiccator, of chlorine gas. By means of a vacuum pump, atmospheric pressure within the said system is reduced to less than one millimeter mercury. Into the resulting evacuated system, in one portion of which the said polymeric 5-phenyl-3-vinyloxazolidin-2-one is distributed over the said glass wool, chlorine is introduced as a gas. The entire system is maintained at room temperature, approximately 24° C. The chlorine gas is introduced at and maintained under a pressure of approximately 2 atmospheres. At the end of 30 days' exposure, the chlorine line is disconnected and removed, the system purged with nitrogen, and the resulting complex of chlorine with the said oxazolidinone compound removed from the glass wool by shaking. The resulting complex powder is analyzed, and found to contain approximately 8.5 weight percent of chlorine. The gas purge from the closed system is analyzed and found to be devoid of even traces of hydrogen chloride.

The chlorine complexes according to the present invention are useful as microbicides. In such use, the present complexes do not require expensive and potentially dangerous high pressure equipment. When it is desired to employ a complex of the present invention for the control of micro-organisms, it is only necessary to add a desired quantity of the said complex as a solid to the region where the antimicrobial action is desired, for example, in water. This procedure does not add any metallic ion to the water.

The chlorine complexes of the present invention are readily compressed to obtain tablets of which the weight and chlorine content remain relatively stable so long as they are preserved in a stoppered container wherein the atmosphere contains an appreciable content of chlorine which may be derived spontaneously from the present chlorine complexes. The complectant acts as a satisfactory binder in such tablets. Thus, such tablets may be included in equipment designed, for example, for camping, for military water supplies, for use in emergency survival by persons exposed to primitive conditions wherein for survival they may need to drink water believed or known to be contaminated with pathogenic microorganisms. The addition to such water of a chlorine complex according to the present invention in an amount to introduce into the said water from approximately one to 50 parts of the said complex per million parts of water results in the total destruction in the water of living microorganisms with the result that, so far as its microflora is concerned the water is potable. The exact amount of complex to be employed will vary: but good antimicrobial results are obtained when employing sufficient complex that the odor of chlorine persists in the water after several minutes' stirring at a temperature of 35° C. or below.

The complectant materials to be employed according to the present invention, including many of the nonpolymeric materials, are readily prepared according to the following general reaction

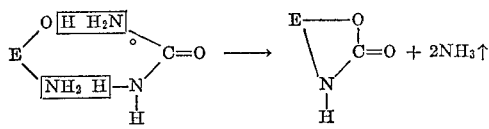

wherein E has the values hereinbefore set forth. By the choice of appropriate starting materials it is possible to prepare oxazolidinones and substituted oxazolidinones of an extremely wide range.

By choice of alternate starting materials, wherein the hydroxyl and amino groups are on carbon atoms having another carbon intermediate, it is possible to carry out a reaction with urea to prepare oxazinidinones. Such starting materials are represented by the general formula

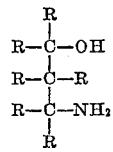

Similarly, when it is desired to produce an oxazepinanone, the starting aminoalkanol is chosen whereof the amino group and hydroxyl group appear on carbon atoms with two other carbon atoms intermediate them, as are shown in the general formula

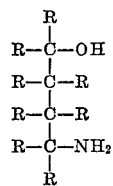

In the foregoing general formulas, the letter R is used to designate hydrogen or a radical substituent for a hydrogen atoms, selected from hydrocarbon, halohydrocarbon or halogen, having a total number of carbon atoms up to 18.

When it is desired to prepare a cyclic carbamate material the structure of which can be predicted from the starting materials, the aminoalkanol material should contain only one hydroxyl group; when only one such hydroxyl group is present the reaction follows the course indicated in the foregoing general reaction. When there is employed an aminoalkanol material containing more than one hydroxyl group, ring closure and resulting formation of a cyclic carbamate may occur between the urea moiety and the amino alkanol moiety involving one, or, as the case may be, the other hydroxyl site. Thus, various reaction products of uncertain identity may be prepared. However, the reactions of two aminodiols have been studied, and they may be employed with confidence. When the starting aminoalkanol compound is 4-amino-1,3-butanediol, the resulting compound is 5-hydroxyethyl-oxazolidin-2-one. When the starting compound is 2-amino-1,4-butanediol, the resulting compound is 4-hydroxyethyloxazolidin-2-one. Either of the said hydroxyethyl oxazolidinones may be dehydrated, as by heating gently in the presence of phosphorus pentoxide ($P_2O_5$) at temperatures in the general range of 50° to 100° and preferably 60° to 70° C. in an inert solvent such as dioxane, pyridine, or the like whereby the hydroxyethyl group, being dehydrated, yields a vinyl group as substituent on said position of the oxazolidinone ring. In an alternative procedure, the oxazolidinone not bearing a substituent upon the ring nitrogen atom may be reacted with an alkenyl alkyl ether in dimethyl formamide solvent and in the presence of mercuric acetate catalyst in a known trans-alkenylation reaction whereby to introduce, as substituent upon the ring nitrogen of oxazolidinone, oxazinidione, or oxazepinanone ring, an alkenyl substituent.

By whatever route prepared, and with such alkenyl group as substituent upon whatever position or positions of the said heterocyclic ring or rings, the resulting compounds are useful as complectants according to the present invention. If it is desired to avoid polymerization, a substance known to act as a polymerization inhibitor to prevent olefin-addition polymerizations, such as sodium hydroxide may be addd to the non-polymeric vinyl-heterocyclic complectant compound.

Alternatively, the alkenyl-substituted heterocyclic complectant materials may, if desired, be polymerized. Such polymerization is readily effected in known procedures, for example by heating the desired monomer or mixture of monomers in a reaction medium such as water, in the presence of a small amount, for example 0.5 weight percent, of a polymerization catalyst such as benzoyl peroxide or $\alpha,\alpha'$-azobis(isobutyronitrile), at a temperature in the range of from 50° C. to 100° C. When it is desired to obtain the high molecular weight polymers, the polymerization is carried out at a temperature in the lower portion of the polymerization temperature range and with a relatively smaller amount, for example, 0.01 to 0.1 weight percent of catalyst. When it is desired to obtain the various low molecular weight polymers of the present invention, representing a very small number of monomeric moieties, the polymerization is carried out at a temperature in the upper portion of the polymerization temperature range, such as 80°–90° C., and in the presence of a relatively larger amount, for example 2 to 3 weight percent of catalyst. Upon completion of the polymerization, the components of the resulting mixture may if desired be separated according to molecular weight in known manners, such as fractional distillation, centrifugation, and the like.

The polymerization of the alkenyl substituted cyclic carbamates alone or with ethylenically unsaturated copolymerizable substances to prepare polymeric including copolymeric complectants to be used in the present invention proceeds in manners generally similar to the polymerization of other alkenyl monomers.

The present polymers and copolymers, in general, show little or no tendency to be injured by exposure to, for example, sunlight, air, and heat and other influences within a moderate temperature range near to living conditions of animal and vegetable organisms.

The present complectants and, correspondingly, the present complexes may readily be formed into desired shapes and sizes. Such forming is, in general, readily effected by the simple means of subjecting the complectants or complex in granular or pulverulent form to a formative pressure in such known procedures as tableting and the like.

The 3-(2-chloroalkyl)oxazolidin-2-ones, oxazinidinones and oxazepinanones and substituted derivatives thereof are readily prepared by the reaction of a haloalkyl alkanolamine such as 2-hydroxyethyl-2-chloroethyl amine, and ethylene carbonate, whereby the N(2-chloroalkyl)-cyclic carbamate is formed, together with ethylene glycol as byproduct of reaction. Substituents upon the hydroxyethyl moiety of the alkanolamine appear as substituent portions upon the group represented by E in the foregoing general formula; with the result that preparation of the desired complectants unsubstituted or with substituents in any desired variety is readily carried out.

The monomeric 3-, 4-, or 5-alkenyl cyclic carbamate compounds used as complectants or as intermediates for the preparation of polymeric complectants may be prepared by known methods wherein a (2-chloroalkyl)-2-oxazolidinone, oxazinidinone or oxazepinanone, or a suitable substituted (2 - chloroethyl)-2-oxazolidinone, oxazinidinone or oxazepinanone is dehydrochlorinated with an alkaline material such as an alkali metal lower alkoxide. These monomers are usually colorless liquids differing from one another in their solubilities in water and in many common organic solvents. Similarly, other derivatives are prepared by suitable known general procedures starting with, for example, the (2-chloroethyl)-2-oxazolidinone, oxazinidinone or oxazepinanone. The benzoxazolidinones may be prepared by known procedures. Such procedures are set forth in Houben-Weyl, Methoden der Organischen Chemie, vol. 8 (Sauerstoffverbindungen III), p. 144 and following (4th ed'n, Stuttgart, (1952). The preparation of benzoxazolidinones from salicylic acid amides by hypochlorite oxidation and spontaneous rearrangement is taught by Graebe and Rostovzeff in Berichte der Deutschen Chemischen Gesellschaft, 35(3), (1902), p. 2751. The benzoxazolidinones thus prepared may be transalkenylated in the manner hereinbefore set forth and the resulting monomeric alkenyl benzoxazolidinones may thereafter be employed as complectants in the preparation of the present complexes, may be alkenyl hydrogenated, or halogenated or hydrohalogenated or polymerized or copolymerized in known manners to prepare numerous of the complectants according to the present invention and thereafter thus employed.

When it is desired to prepare the benzoxazinidinones, benzoxazepinanones with the cyclic carbamate compounds having 6, or as the case may be, 7 members in the heterocyclic ring this may readily be accomplished by the oxidation, in the manner described, of 2(o-hydroxyphenyl)acetamide in the case of the benzoxazinidinones or, to produce the benzoxazepinanones, the oxidation of 3(o-hydroxyphenyl)propionamide. Also, of course, in any such instance, the employment of starting hydroxyphenyl compounds upon the phenyl ring of which appear other substituents will result in the preparation of benzoxazinidinones bearing the said other substituents.

I claim:

1. A complex of chlorine and a member of the group consisting of the N-alkyl cyclic carbamates, N-haloalkyl cyclic carbamates, and polymers of N-alkenyl cyclic carbamates, wherein the N-alkenyl radical contains from 2 to 4 carbon atoms, inclusive, the N-alkyl radical contains from 2 to 4 carbon atoms, inclusive, and not more than 2 halogen atoms, and wherein the oxygen and nitrogen atoms are connected through a divalent bridging radical which is from 2 to 4 carbon atoms in length and which is selected from hydrocarbon and halohydrocarbon and is at least a portion of a component radical selected from the group consisting of orthophenylene and substituted orthophenylene, alkylene, cycloalkylalkylene, phenylalkylene and naphthylalkylene, each said component radical containing from 2 to 18 carbon atoms, inclusive.

2. Complex of chlorine and polymeric 5-methyl-3-vinyloxazolidin-2-one.

3. A compressed tablet useful in water as an antimicrobial agent comprising as principal active component a complex of chlorine and polymeric 5-methyl-3-vinyl-oxazolidin-2-one.

4. Complex of chlorine and polymeric 5-ethyl-3-vinyl-oxazolidin-2-one.

5. Complex of chlorine and dimethyloxazolidinone.

6. A complex of chlorine and polymeric N-vinyl-2-oxazinidinone.

7. A method of preparing a complex of chlorine and a member of the group of cyclic carbamate compounds consisting of the N-alkyl cyclic carbamates, N-haloalkyl cyclic carbamates, and polymers of N-alkenyl cyclic carbamates, wherein the N-alkenyl radical contains from 2 to 4 carbon atoms, inclusive, the N-alkyl radical contains from 2 to 4 carbon atoms, inclusive, the N-haloalkyl radical contains from 2 to 4 carbon atoms, inclusive, and not more than 2 halogen atoms, and wherein the oxygen and nitrogen atoms are connected through a divalent bridging radical which is from 2 to 4 carbon atoms in length and which is selected from hydrocarbon and halohydrocarbon and is at least a portion of a component radical selected from the group consisting of orthophenylene and substituted orthophenylene, alkylene, cycloalkylalkylene, phenylalkylene and naphthylalkylene, each said component radical containing from 2 to 18 carbon atoms, inclusive, which comprises bringing the said halogen and the said cyclic carbamate compound into contact with one another.

8. Method of claim 6 carried out under conditions of temperature and pressure at which the chlorine is liquid.

(References on following page)

References Cited in the file of this patent

UNITED STATES PATENTS

| | | |
|---|---|---|
| 2,739,922 | Shelandski | Mar. 27, 1956 |
| 2,818,362 | Drechsel | Dec. 31, 1957 |
| 2,872,321 | Walles et al. | Feb. 3, 1959 |
| 2,872,322 | Walles et al. | Feb. 3, 1959 |
| 2,873,192 | Walles et al. | Feb. 10, 1959 |
| 2,891,058 | Walles et al. | July 16, 1959 |
| 2,919,279 | Walles et al. | Dec. 29, 1959 |
| 2,946,772 | Walles et al. | July 26, 1960 |
| 2,946,773 | Walles et al. | July 26, 1960 |
| 2,948,656 | Tousignant et al. | Aug. 9, 1960 |
| 2,948,708 | Walles et al. | Aug. 9, 1960 |